United States Patent
Laplante et al.

(10) Patent No.: US 11,886,541 B2
(45) Date of Patent: Jan. 30, 2024

(54) SYSTEMS AND METHODS FOR GENERATING SYNTHETIC IMAGES OF A TRAINING DATABASE

(71) Applicant: Ford Motor Company, Dearborn, MI (US)

(72) Inventors: Walter Laplante, Bloomfield Hills, MI (US); Francis Maslar, Grosse Ile, MI (US); Harry Kekedjian, Tecumseh (CA); Nagharajhan KPK, Salem (IN); Siva Sankar R., Chennai (IN)

(73) Assignee: Ford Motor Company, Dearborn, MI (US)

( * ) Notice: Subject to any disclaimer, the term of this patent is extended or adjusted under 35 U.S.C. 154(b) by 87 days.

(21) Appl. No.: 17/528,866

(22) Filed: Nov. 17, 2021

(65) Prior Publication Data

US 2023/0153385 A1 May 18, 2023

(51) Int. Cl.
| | | |
|---|---|---|
| *G06T 17/20* | (2006.01) | |
| *G06F 18/214* | (2023.01) | |
| *G06T 15/04* | (2011.01) | |
| *G06V 20/10* | (2022.01) | |
| *G06F 18/2431* | (2023.01) | |

(52) U.S. Cl.
CPC ........ *G06F 18/214* (2023.01); *G06F 18/2431* (2023.01); *G06T 15/04* (2013.01); *G06T 17/20* (2013.01); *G06V 20/10* (2022.01)

(58) Field of Classification Search
None
See application file for complete search history.

(56) References Cited

U.S. PATENT DOCUMENTS

| | | | |
|---|---|---|---|
| 8,345,940 B2* | 1/2013 | Mattiuzzi | G06T 7/48 382/128 |
| 9,665,800 B1 | 5/2017 | Kuffner, Jr. | |
| 10,459,827 B1* | 10/2019 | Aghdaie | G06F 11/0751 |
| 10,769,862 B2 | 9/2020 | Bleiweiss et al. | |
| 10,984,317 B2* | 4/2021 | Panciatici | G06T 17/00 |
| 11,334,762 B1* | 5/2022 | Wrenninge | G06F 18/214 |
| 2001/0005204 A1* | 6/2001 | Matsumoto | G06T 15/10 345/418 |
| 2018/0033193 A1* | 2/2018 | Goel | G06T 15/04 |
| 2018/0308285 A1* | 10/2018 | Doyle | G06T 17/205 |
| 2019/0385364 A1 | 12/2019 | Joseph et al. | |
| 2020/0005083 A1 | 1/2020 | Collins | |
| 2020/0342652 A1 | 10/2020 | Rowell et al. | |
| 2021/0034961 A1* | 2/2021 | Lovell | G06F 30/20 |
| 2022/0035961 A1* | 2/2022 | Ziabari | G06T 11/008 |
| 2022/0156513 A1* | 5/2022 | Lee | G06F 18/214 |
| 2023/0030088 A1* | 2/2023 | Afrasiabi | G06T 19/20 |

* cited by examiner

*Primary Examiner* — Sultana M Zalalee
(74) *Attorney, Agent, or Firm* — Burris Law, PLLC

(57) ABSTRACT

A method includes generating one or more nominal images of at least a portion of a digital twin of an environment, defining one or more anomalous characteristics of the one or more components, generating one or more anomalous images of the portion of the digital twin of the environment based on the field of view and the one or more anomalous characteristics, performing a tessellation routine and a texture mapping routine on the one or more nominal images and the one or more anomalous images to generate a plurality of synthetic images, and labeling, for each synthetic image from among the plurality of synthetic images, the synthetic image as one of an anomalous type, a nominal type, or a combination thereof.

20 Claims, 4 Drawing Sheets

SYSTEMS AND METHODS FOR GENERATING SYNTHETIC IMAGES OF A TRAINING DATABASE

FIELD

The present disclosure relates to systems and methods for generating synthetic images of a training database.

BACKGROUND

The statements in this section merely provide background information related to the present disclosure and may not constitute prior art.

Artificial intelligence (AI)-based and machine learning (ML)-based image analysis systems may perform various supervised image-processing routines to identify various characteristics of, for example, one or more vehicle components. Accordingly, the image analysis systems may iteratively receive numerous training images of the vehicle components to sufficiently learn how to identify the relevant vehicle components from an image and determine a characteristic of the identified vehicle components (e.g., the identified vehicle component is damaged or not installed properly). However, current training routines utilize numerous real images of the vehicle components and the desirable/undesirable characteristics, thereby requiring a substantial amount of time and effort to sufficiently train the image analysis systems. These and other issues associated with training image analysis systems are addressed by the present disclosure.

SUMMARY

This section provides a general summary of the disclosure and is not a comprehensive disclosure of its full scope or all of its features.

The present disclosure provides a method for training an image analysis system including generating one or more nominal images of at least a portion of a digital twin of an environment, where the digital twin is a virtual representation of the environment, and where the one or more nominal images are based on a field of view (FOV) of an image sensor of the digital twin and one or more nominal characteristics of one or more components of the digital twin. The method includes defining one or more anomalous characteristics of the one or more components, generating one or more anomalous images of the portion of the digital twin of the environment based on the field of view and the one or more anomalous characteristics, performing a tessellation routine and a texture mapping routine on the one or more nominal images and the one or more anomalous images to generate a plurality of synthetic images, and labeling, for each synthetic image from among the plurality of synthetic images, the synthetic image as one of an anomalous type, a nominal type, or a combination thereof.

In one form, the method further includes performing a decimation routine on the one or more nominal images and the one or more anomalous images to generate the plurality of synthetic images. In one form, the texture mapping routine is a UV mapping routine. In one form, the field of view is based on a nominal position coordinate of the image sensor and a nominal orientation of the image sensor. In one form, the method further includes performing an augmentation routine on the plurality of synthetic images in response to labeling the plurality of synthetic images. In one form, the method further includes defining one or more adjusted field of views of the image sensor, generating one or more auxiliary nominal images of the portion of the digital twin of the environment based on the one or more adjusted field of views and the one or more nominal characteristics, and generating one or more auxiliary anomalous images of the portion of the digital twin of the environment based on the one or more adjusted field of views and the one or more anomalous characteristics, where the plurality of synthetic images are further based on the one or more auxiliary nominal images and the one or more auxiliary anomalous images. In one form, the one or more adjusted field of views are based on an adjusted position coordinate of the image sensor, an adjusted orientation of the image sensor, or a combination thereof. In one form, the method further includes performing the tessellation routine and the texture mapping routine on the one or more auxiliary nominal images and the one or more auxiliary anomalous images to generate the plurality of synthetic images. In one form, the image sensor is disposed on one of a robot and a structure of the digital twin.

The present disclosure provides a system for training an image analysis system. The system includes a processor and a nontransitory computer-readable medium including instructions that are executable by the processor. The instructions include generating one or more nominal images of at least a portion of a digital twin of the environment, where the digital twin is a virtual representation of the environment, and where the one or more nominal images are based on a field of view of an image sensor of the digital twin and one or more nominal characteristics of one or more components of the digital twin. The instructions include defining one or more adjusted field of views of the image sensor, generating one or more auxiliary nominal images of at least the portion of the digital twin of the environment based on the one or more adjusted field of views and the one or more nominal characteristics, defining one or more anomalous characteristics of the one or more components, and generating one or more anomalous images of the portion of the digital twin of the environment based on the field of view and one or more anomalous characteristics of the one or more components. The instructions include generating one or more auxiliary anomalous images of the portion of the digital twin of the environment based on the one or more adjusted field of views and the one or more anomalous characteristics, performing a tessellation routine and a texture mapping routine on the one or more nominal images, the one or more auxiliary nominal images, the one or more anomalous images, and the one or more auxiliary anomalous images to generate a plurality of synthetic images, and labeling, for each synthetic image from among the plurality of synthetic images, the synthetic image as one of an anomalous type, a nominal type, or a combination thereof.

In one form, the instructions further include performing a decimation routine on the one or more nominal images and the one or more anomalous images to generate the plurality of synthetic images. In one form, the texture mapping routine is a UV mapping routine. In one form, the field of view is based on a nominal position coordinate of the image sensor and a nominal orientation of the image sensor. In one form, the instructions further comprise performing an augmentation routine on the plurality of synthetic images in response to labeling the plurality of synthetic images. In one form, the one or more adjusted field of views are based on an adjusted position coordinate of the image sensor, an adjusted orientation of the image sensor, or a combination thereof.

The present disclosure provides a method including generating one or more nominal images of at least a portion of a digital twin of the environment, where the digital twin is a virtual representation of the environment, where the one or more nominal images are based on a field of view of an image sensor of the digital twin and one or more nominal characteristics of one or more components of the digital twin, and where the field of view is based on a nominal position coordinate of the image sensor and a nominal orientation of the image sensor. The method includes defining one or more adjusted field of views of the image sensor and generating one or more auxiliary nominal images of the portion of the digital twin of the environment based on the one or more adjusted field of views and the one or more nominal characteristics, where the one or more adjusted field of views are based on an adjusted position coordinate of the image sensor, an adjusted orientation of the image sensor, or a combination thereof. The method includes defining one or more anomalous characteristics of the one or more components, generating one or more anomalous images of the portion of the digital twin of the environment based on the field of view and one or more anomalous characteristics of the one or more components, and generating one or more auxiliary anomalous images of the portion of the digital twin of the environment based on the one or more adjusted field of views and the one or more anomalous characteristics. The method includes performing a tessellation routine and a texture mapping routine on the one or more nominal images, the one or more auxiliary nominal images, the one or more anomalous images, and the one or more auxiliary anomalous images to generate a plurality of synthetic images and labeling, for each synthetic image from among the plurality of synthetic images, the synthetic image as one of an anomalous type, a nominal type, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
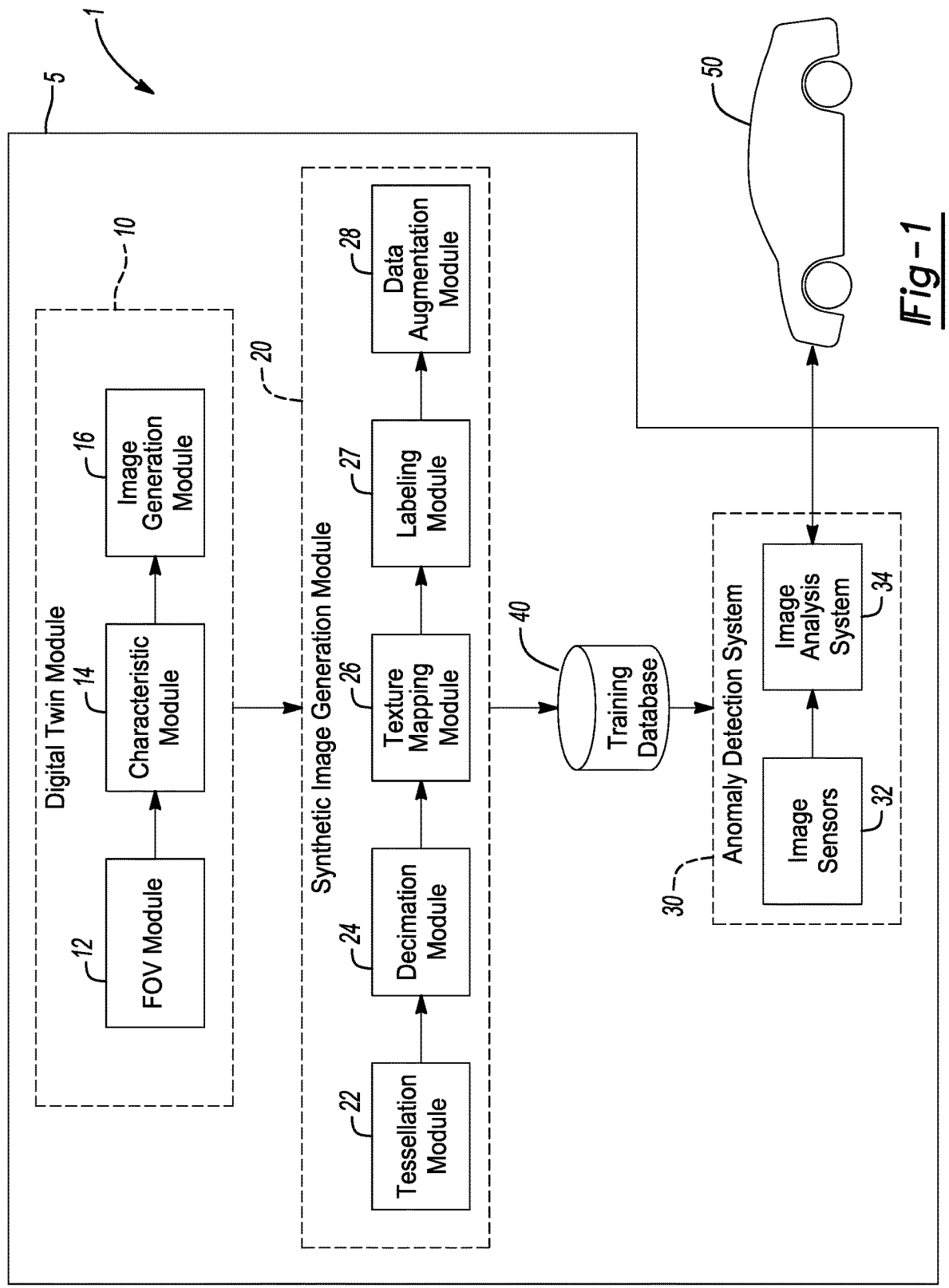
FIG. 1 illustrates a functional block diagram of a system for inspecting a vehicle in accordance with the teachings of the present.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a synthetic image generation module configured to provide synthetic images that are utilized to train an image analysis system that performs various AI and ML routines, such as convolutional neural network routines, deep neural network routines, computer vision routines, among others. The synthetic image generation module generates nominal images based on a field of view of an image sensor of a digital twin representing the environment and one or more nominal characteristics of various components of the digital twin. Additionally, the synthetic image generation module generates anomalous images based on the field of view and one or more anomalous characteristics associated with the components. Moreover, the synthetic image generation module generates auxiliary nominal images and auxiliary anomalous images based on one or more adjusted field of views and/or nominal/anomalous characteristics associated with the components.

The synthetic image generation module subsequently performs various image processing routines, such as a tessellation routine, a decimation routine, a texture mapping routine, and an augmentation routine to generate a plurality of synthetic images. The synthetic image generation module labels the synthetic images as an anomalous type, a nominal type, or a combination thereof in accordance with known training routines. Accordingly, the synthetic image generation module enables an operator to virtually and arbitrarily define various anomalies using a digital twin associated with a component when training an image analysis system, thereby foregoing the need to define and construct real anomalies with actual components of the environment. As such, the synthetic image generation module inhibits the amount of time and resources utilized to train the image analysis systems.

Referring to FIG. 1, an environment 1 (e.g., a manufacturing facility) including a quality control system 5 for detecting defects of a vehicle 50 is provided. The quality control system 5 generally includes a digital twin module 10, a synthetic image generation module 20, an anomaly detection system 30, and a training database 40. It should be readily understood that any one of the components of the quality control system 5 can be provided at the same location or distributed at different locations (e.g., via one or more edge computing devices) and communicably coupled accordingly. As an example, the anomaly detection system 30 may be provided on at an edge computing device (e.g., a smartphone, a laptop, a tablet, among other mobile computing devices) and communicably coupled to the training database 40 via a wireless communication protocol (e.g., a message queuing telemetry transport (MQTT) protocol, a Bluetooth®-type protocol, a cellular protocol, a wireless fidelity (Wi-Fi)-type protocol, a near-field communication (NFC) protocol, an ultra-wideband (UWB) protocol, among others). As another example, the digital twin module 10, the synthetic image generation module 20, and the training database 40 may be provided on a first computing device, and the anomaly detection system 30 may be provided on a second computing device communicably coupled to the first computing device via the wireless communication protocol or a wired communication protocol.

In one form, the anomaly detection system 30 includes image sensors 32 and an image analysis system 34. In one form, the image sensors 32 are configured to obtain images of the vehicle 50. In one form, the image sensors 32 are provided by exterior/interior image sensors of the vehicle 50, image sensors that are removable from the vehicle 50 when a manufacturing operation/process is completed, image sensors that are disposed on a robot (e.g., a fixed robot, an autonomous robot, among others), and/or image sensors of a mobile computing device (e.g., a smartphone, a tablet, among others). Example image sensors 32 include, but are not limited to, a two-dimensional (2D) camera, a three-dimensional (3D) camera, a red-green-blue (RGB) camera, a stereo vision camera, an infrared sensor, a radar scanner, a laser scanner, and/or a light detection and ranging (LIDAR) sensor.

In one form, the image analysis system 34 is configured to perform an AI routine, an ML routine, a vision routine, and/or any other type of image processing routine based on one or more synthetic images stored in the training database 40 to determine whether the vehicle 50 includes an anomaly (e.g., a component of the vehicle 50 includes a dent, scratch, or an alignment/installation error). Example AI routines include, but are not limited to, convolutional neural network-based routines, deep neural network-based routines, computer vision-based routines, among others. Additional details describing the generation of the synthetic images stored in the training database 40 are provided below.

Figure 2:
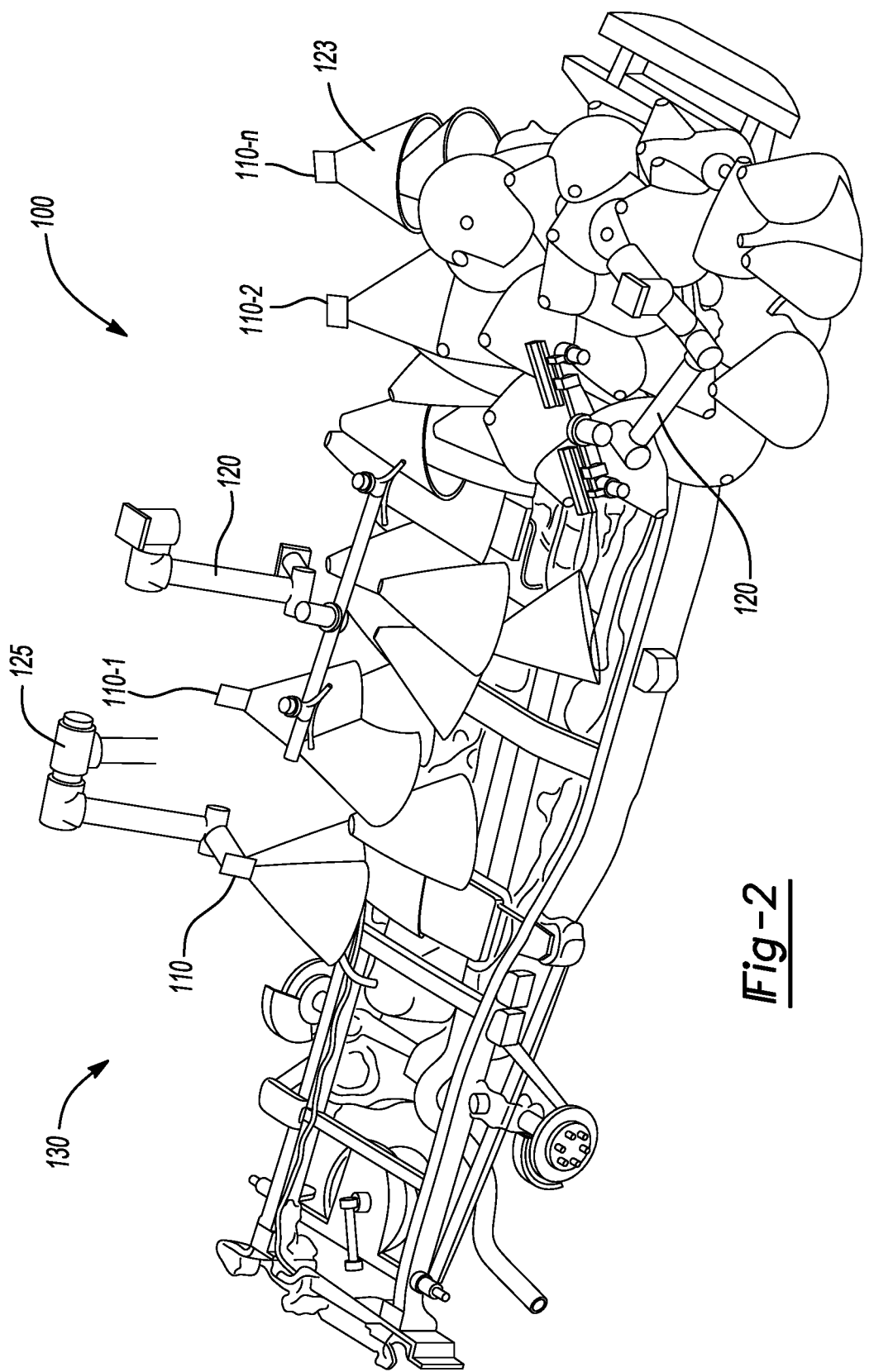
FIG. 2 illustrates a digital twin of an environment and one or more components of a vehicle in accordance with the teachings of the present disclosure.

Referring to FIGS. 1-2, in one form, the digital twin module 10 is configured to generate images of at least a portion of a digital twin 100 (i.e., a virtual representation) of the environment 1. In one form, the digital twin 100 is a 3D digital model that includes various virtual representations of systems/components within the environment 1, such as virtual image sensors 110-1, 110-2, . . . 110-n (collectively referred to hereinafter as "virtual image sensors 110") that correspond to image sensors 32 of the anomaly detection system 30. Specifically, the virtual image sensors 110 are digital representations of the image sensors 32 and thus, may correspond to the dimensions, 3D position coordinate, and orientation of the image sensors 32 within the environment 1. In one form, the 3D digital model includes virtual robots 120 having virtual image sensors 110 disposed thereon and that correspond to the dimensions, 3D position coordinates, orientations, and FOVs (illustrated by cones 123 in FIG. 2) of one or more robots of the environment 1 (not shown). In one form, the 3D digital model includes virtual infrastructure elements 125 having virtual image sensors 110 disposed thereon and that correspond to the dimensions, 3D position coordinates, markings, and orientations of one or more additional elements of the environment 1, such as poles, beams, conveyors, workstations, among other elements of the environment. In one form, the 3D model includes a virtual vehicle 130 that corresponds to the vehicle 50 and one or more components thereof at various stages of a manufacturing routine. In one form, the 3D digital model is a computer-aided design (CAD) file, a standard tessellation language (STL) file, and/or any other file type configured to provide a 3D digital model of the environment 1.

In one form, the digital twin module 10 includes a FOV module 12, a characteristic module 14, and an image generation module 16. In one form, the FOV module 12 is configured to select one of the virtual image sensors 110 of the digital twin 100. In one form, the digital twin module 10 may include a human-machine interface (HMI), such as an input device (e.g., a keyboard, mouse, among other input devices), a graphical user interface (e.g., a touchscreen display), and/or other types of HMIs configured to receive inputs from an operator corresponding to the selection of the virtual image sensors 110.

In one form, the FOV module 12 is configured to identify a nominal FOV of the selected virtual image sensor 110. In one form, the nominal FOV is defined based on a nominal position coordinate (e.g., a 3D position coordinate) and a nominal orientation of the selected virtual image sensor 110. Specifically, the nominal position coordinate and nominal orientation may be associated with a 3D position coordinate/orientation of the corresponding image sensor 32 when it obtains image data of the vehicle 50 for subsequent analysis by the image analysis system 34. In one form, the nominal FOV is based on a pixel density, focal length, height, width, and/or geometry of the virtual image sensors 110.

In one form, the FOV module 12 is configured to adjust the nominal FOV to define one or more adjusted FOVs of the selected virtual image sensor 110. The adjusted FOVs are defined based on an adjusted position coordinate and/or an adjusted orientation of the selected virtual image sensor 110. To define the adjusted FOVs, an operator may provide inputs to the HMI of the digital twin module 10 corresponding to the adjusted or the nominal FOV.

In one form, the characteristic module 14 is configured to define nominal characteristics and anomalous characteristics (collectively referred to hereinafter as "one or more characteristics") of the components of the virtual vehicle 130. As used herein, a "nominal characteristic of the component" refers to a characteristic (e.g., a dimension, position, orientation, surface quality, state, type, and/or any other qualitative/quantitative feature) of the component that satisfies a predefined value and/or criteria. As used herein, an "anomalous characteristic of the component" refers to a characteristic of the component that does not satisfy a predefined value and/or criteria. As an example, a vehicle clip (as the component of the virtual vehicle 130) may have a nominal characteristic associated with a predefined size, position, and orientation and being properly secured to a wire harness. Furthermore, the vehicle clip may have an anomalous characteristic associated with deviations from the predefined size, position, or orientation and/or not being properly secured to a wire harness. To define the one or more characteristics, an operator may provide inputs to the HMI of the digital twin module 10 corresponding to manipulating the components of the virtual vehicle 130 to satisfy the one or more characteristics (e.g., using a mouse/keyboard to define the characteristics of vehicle clip) and importing CAD files with the components having one of the anomalous/nominal characteristics (e.g., importing CAD files of a vehicle clip with a proper connection and an improper connection between a wire harness and a fuel pump assembly).

In one form, the image generation module 16 is configured to generate one or more nominal images of at least a portion of the digital twin 100 based on the nominal FOV and the one or more nominal characteristics of the one or more components of the virtual vehicle 130. In one form, the image generation module 16 is configured to generate one or more auxiliary nominal images of at least a portion of the digital twin 100 based on one or more adjusted FOVs (i.e., a FOV that is unequal to the nominal FOV) and the one or more nominal characteristics of the one or more components of the virtual vehicle 130.

The image generation module 16 is configured to generate one or more anomalous images of at least a portion of the digital twin 100 based on the nominal FOV and the one or more adjusted characteristics of the one or more components of the virtual vehicle 130. In one form, the image generation module 16 is configured to generate one or more auxiliary anomalous images of at least a portion of the digital twin 100 based on the one or more adjusted FOVs and the one or more anomalous characteristics of the one or more components of the virtual vehicle 130.

The one or more nominal images and the one or more auxiliary nominal images are collectively referred to hereinafter as "the nominal images." The one or more anomalous images and the one or more auxiliary anomalous images are collectively referred to hereinafter as "the anomalous images." As used herein, "a set of nominal and anomalous images" refers to at least one of the one or more nominal images, the one or more auxiliary nominal images, the one or more anomalous images, and the one or more auxiliary anomalous images.

In one form, the synthetic image generation module 20 includes a tessellation module 22, a decimation module 24, a texture mapping module 26, a labeling module 27, and a data augmentation module 28. In one form, the tessellation module 22 is configured to perform a tessellation routine on the set of nominal and anomalous images. As used herein, the "tessellation routine" refers to converting the components of the virtual vehicle 130 into a plurality of vertices, edges, faces, surfaces, and materials that collectively form a polyhedral representation of the components. The faces may have various shapes, such as triangles, quadrilaterals, convex polygons, and/or concave polygons. In one form, the tessellation module 22 may be implemented by known vector graphic rendering systems, such as OpenGL and/or Direct3D.

In one form, the decimation module 24 is configured to perform a decimation routine on the set of nominal and anomalous images. As used herein, the "decimation routine" refers to compressing the one or more tessellated images by selectively removing vertices from the one or more tessellated images. In one form, the vertices are removed based on the surface associated with vertices (e.g., vertices associated with surfaces having a low curvature may be removed provided that the structural integrity of the component is maintained), a predetermined number of faces (e.g., 100,000 faces/polygons), or a combination thereof. It should be understood that the decimation module 24 may be removed from the synthetic image generation module 20 in some forms.

In one form, the texture mapping module 26 is configured to perform a texture mapping routine on the set of nominal and anomalous images to generate a plurality of synthetic images. In one form, the texture mapping module 26 performs the texture mapping routine in response to the tessellation module 22 performing the tessellation routine on the set of nominal and anomalous images. In one form, the texture mapping module 26 performs the texture mapping routine in response to the decimation module 24 performing the decimation routine on the set of nominal and anomalous images. As used herein, the "texture mapping routine" refers to defining a surface texture of the component by projecting a 2D bitmap image or a procedural texture associated with the component onto the set of nominal and anomalous images. As an example, the texture mapping module 26 may perform a UV mapping routine (as the texture mapping routine). It should be understood that the texture mapping module 26 may perform other types of texture mapping routines and is not limited to the example described herein.

Figure 3A:
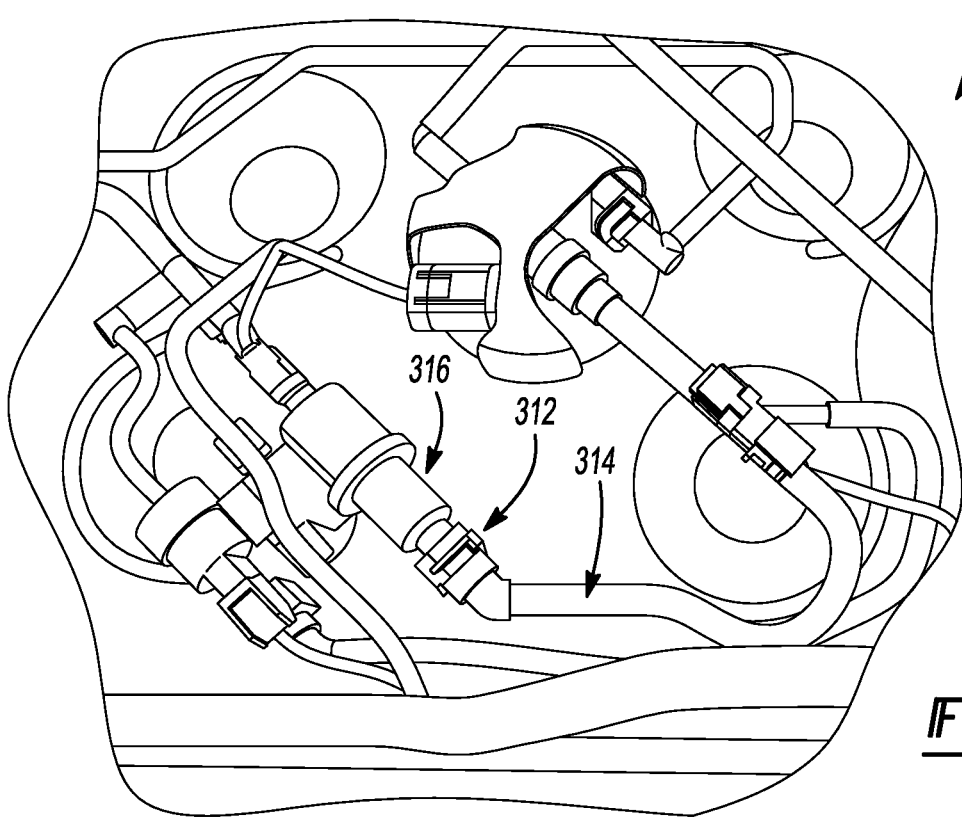
FIG. 3A illustrates a synthetic image associated with a nominal characteristic in accordance with the teachings of the present disclosure.
Figure 3B:
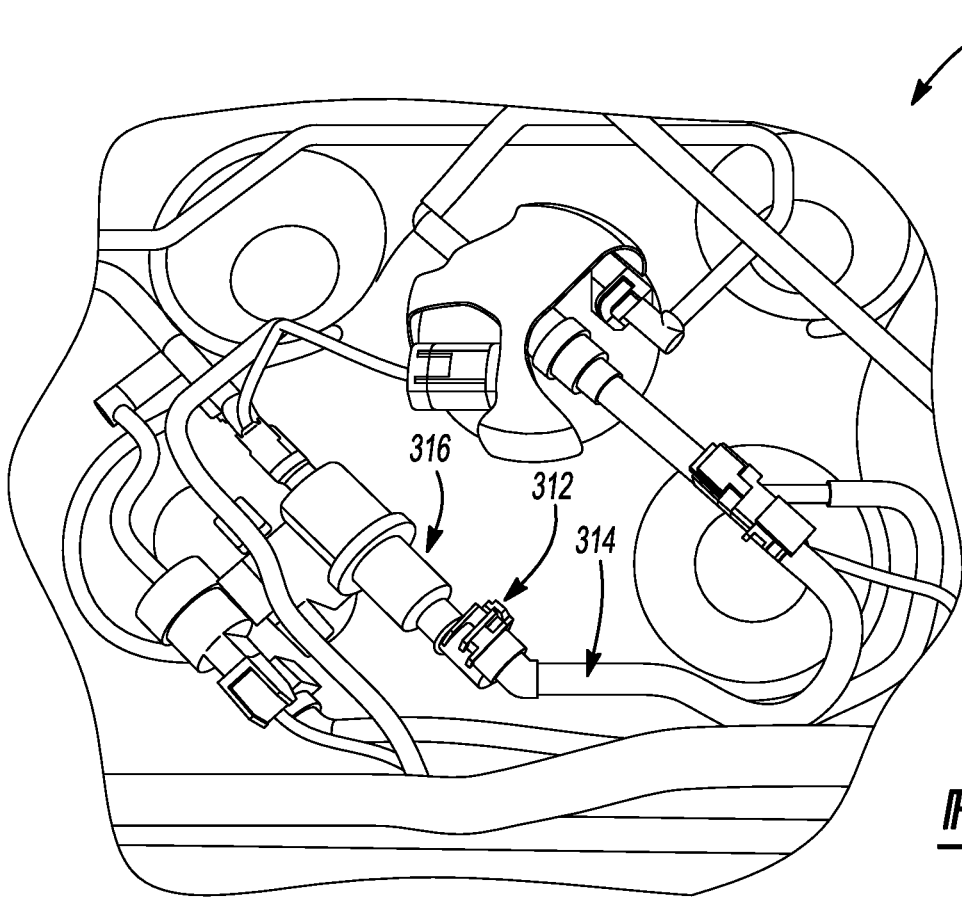
FIG. 3B illustrates a synthetic image associated with an anomalous characteristic in accordance with the teachings of the present disclosure.

In one form and referring to FIGS. 1 and 3A-3B, the tessellation module 22 and the texture mapping module 26 (and optionally, the decimation module 24) may collectively generate synthetic images 310, 320 associated with a vehicle clip 312, a wire harness 314, and a fuel pump assembly 316. As an example, the digital twin 10 module provides a nominal image or auxiliary nominal image having a nominal/adjusted FOV that depicts a vehicle clip properly connecting a wire harness and a fuel pump assembly (as the nominal characteristic) to the synthetic image generation module 20. Accordingly, the tessellation module 22, the decimation module 24, and the texture mapping module 26 may collectively perform the tessellation, decimation, and texture mapping routines on the nominal/auxiliary nominal image to generate the synthetic image 310.

As another example, the digital twin 10 module provides an anomalous image or auxiliary anomalous image having the nominal/adjusted FOV and depicting a vehicle clip improperly connecting a wire harness and a fuel pump assembly (as the anomalous characteristic) to the synthetic image generation module 20. Accordingly, the tessellation module 22, the decimation module 24, and the texture mapping module 26 may collectively perform the tessellation, decimation, and texture mapping routines on the anomalous/auxiliary anomalous image to generate the synthetic image 320. While the synthetic images 310, 320 described herein are associated with a vehicle clip 312, a wire harness 314, and a fuel pump assembly 316 of a vehicle, it should be understood that the tessellation module 22 and the texture mapping module 26 (and optionally, the decimation module 24) may collectively generate synthetic images for other components and/or other nominal/anomalous characteristics and are not limited to the examples described herein.

In one form, the labeling module 27 is configured to label each synthetic image as one of an anomalous type, a nominal type, or a combination thereof. In one form, an operator and/or a classifier module may provide inputs to an HMI of the labeling module 27 corresponding to the desired label (e.g., defining the synthetic images as the anomalous and/or nominal type using bounding boxes, semantic segmentation, and/or cuboidal annotation). As an example, an operator may label the synthetic image 310 as a nominal type and the synthetic image 320 as the anomalous type.

In one form, the data augmentation module 28 is configured to perform an augmentation routine on the synthetic images and in response to labeling the synthetic images. As an example, the data augmentation module 28 may apply a kernel to the synthetic images to append the images with noise, blurs, colors, sharpness adjustments, rotations, and/or size adjustments, thereby improving the accuracy of the image analysis system 34. It should be understood that the data augmentation module 28 may be removed from the synthetic image generation module 20 in some forms.

In one form, the labeling module 27 or the data augmentation module 28 store the labeled synthetic images in the training database 40, thereby enabling the image analysis system 34 to perform the training routines described above based on the synthetic images generated by the synthetic image generation module 20 and, optionally, real images obtained from the image sensors 32.

Figure 4:
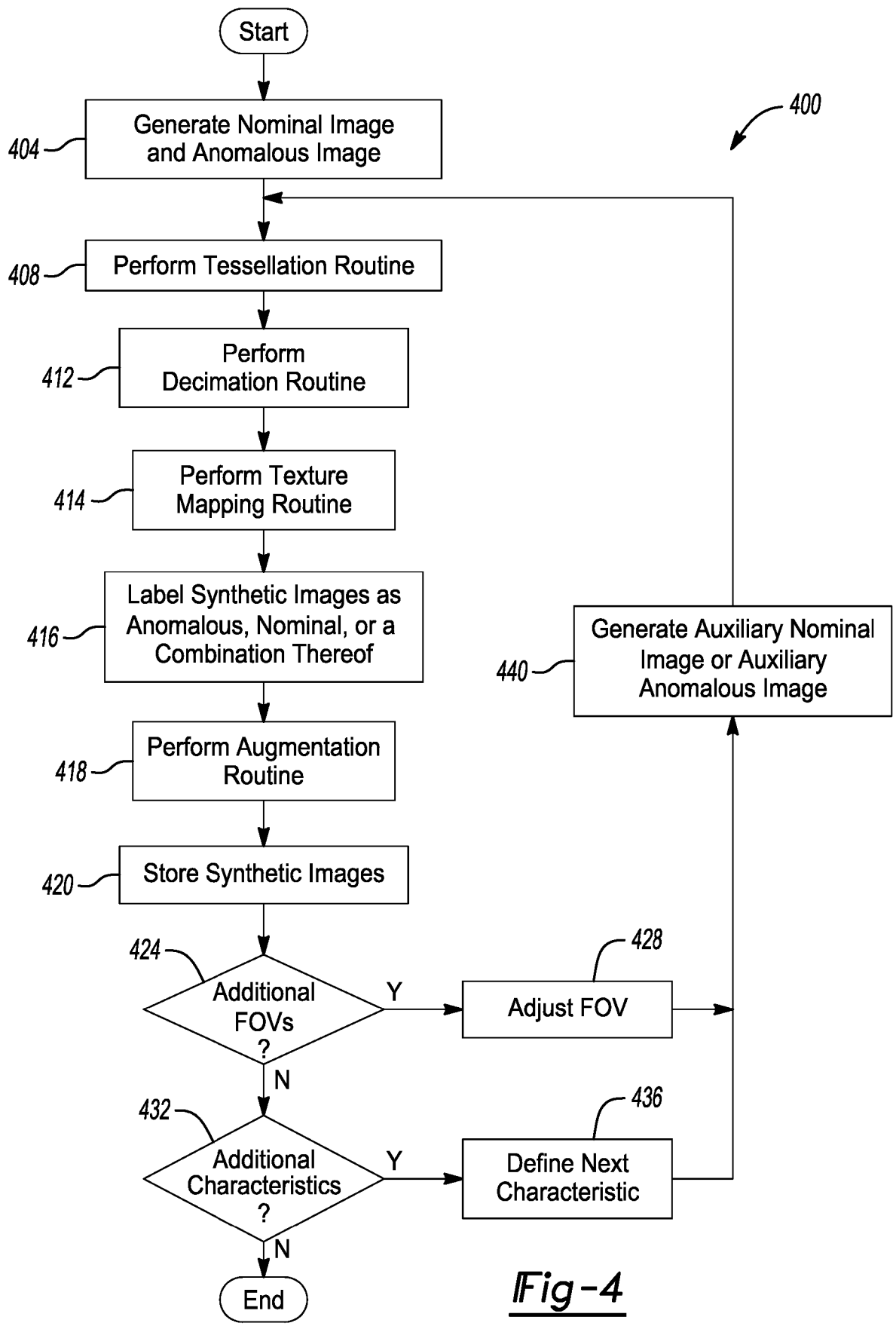
FIG. 4 illustrates an example routine for generating synthetic images of a training database in accordance with the teachings of the present disclosure.

Referring to FIG. 4, an example routine 400 for generating and storing synthetic images in the training database 40 is shown. As described herein, the image analysis system 34 performs known training routines based on the synthetic images of the training database 40. At 404, the digital twin module 10 generates a nominal image and an anomalous image. At 408, the synthetic image generation module 20 performs the tessellation routine, and the synthetic image generation module 20 performs the decimation routine at 412. At 414, the synthetic image generation module 20 performs the texture mapping routine, and the synthetic image generation module 20 labels the synthetic images as an anomalous type, a nominal type, or a combination thereof at 416. At 418, the synthetic image generation module 20 performs the augmentation routine on the synthetic images, and the synthetic image generation module 20 stores the synthetic images in the training database 40 at 420.

At 424, the synthetic image generation module 20 determines whether additional synthetic images corresponding to additional FOVs need to be generated. If so, the routine 400 proceeds to 428, where the digital twin module 10 adjusts the FOV and proceeds to 440. If the synthetic image generation module 20 determines no additional synthetic images corresponding to the additional FOVs need to be generated at 424, the routine 400 proceeds to 432.

At 432, the synthetic image generation module 20 determines whether additional synthetic images corresponding to additional nominal and/or anomalous characteristics need to be generated. If so, the routine 400 proceeds to 432, where the digital twin module 10 defines the next nominal and/or anomalous characteristic and proceeds to 440. If the synthetic image generation module 20 determines no additional nominal and/or anomalous characteristics need to be generated at 432, the routine 400 ends. At 440, the digital twin module 10 generates an auxiliary nominal image or an auxiliary anomalous image based on one of the adjusted FOV and/or the defined characteristic and proceeds to 408.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for training an image analysis system comprising:
    generating one or more nominal images of at least a portion of a digital twin of an environment, wherein the digital twin is a virtual representation of the environment, and wherein the one or more nominal images are based on a field of view of an image sensor of the digital twin and one or more nominal characteristics of one or more components of the digital twin;
    defining one or more anomalous characteristics of the one or more components;
    generating one or more anomalous images of the portion of the digital twin of the environment based on the field of view and the one or more anomalous characteristics;
    performing a tessellation routine and a texture mapping routine on the one or more nominal images and the one or more anomalous images to generate a plurality of synthetic images; and
    labeling, for each synthetic image from among the plurality of synthetic images, the synthetic image as one of an anomalous type, a nominal type, or a combination thereof.

2. The method of claim 1 further comprising performing a decimation routine on the one or more nominal images and the one or more anomalous images to generate the plurality of synthetic images.

3. The method of claim 1, wherein the texture mapping routine is a UV mapping routine.

4. The method of claim 1, wherein the field of view is based on a nominal position coordinate of the image sensor and a nominal orientation of the image sensor.

5. The method of claim 1 further comprising performing an augmentation routine on the plurality of synthetic images in response to labeling the plurality of synthetic images.

6. The method of claim 1 further comprising:
    defining one or more adjusted field of views of the image sensor;
    generating one or more auxiliary nominal images of the portion of the digital twin of the environment based on the one or more adjusted field of views and the one or more nominal characteristics; and
    generating one or more auxiliary anomalous images of the portion of the digital twin of the environment based on the one or more adjusted field of views and the one or more anomalous characteristics, wherein the plurality of synthetic images are further based on the one or more auxiliary nominal images and the one or more auxiliary anomalous images.

7. The method of claim 6, wherein the one or more adjusted field of views are based on an adjusted position coordinate of the image sensor, an adjusted orientation of the image sensor, or a combination thereof.

8. The method of claim 6 further comprising performing the tessellation routine and the texture mapping routine on the one or more auxiliary nominal images and the one or more auxiliary anomalous images to generate the plurality of synthetic images.

9. The method of claim 1, wherein the image sensor is disposed on one of a robot and a structure of the digital twin.

10. A system for training an image analysis system, the system comprising:
- a processor; and
- a nontransitory computer-readable medium including instructions that are executable by the processor, wherein the instructions include:
  - generating one or more nominal images of at least a portion of a digital twin of an environment, wherein the digital twin is a virtual representation of the environment, and wherein the one or more nominal images are based on a field of view of an image sensor of the digital twin and one or more nominal characteristics of one or more components of the digital twin;
  - defining one or more adjusted field of views of the image sensor;
  - generating one or more auxiliary nominal images of at least the portion of the digital twin of the environment based on the one or more adjusted field of views and the one or more nominal characteristics;
  - defining one or more anomalous characteristics of the one or more components;
  - generating one or more anomalous images of the portion of the digital twin of the environment based on the field of view and one or more anomalous characteristics of the one or more components;
  - generating one or more auxiliary anomalous images of the portion of the digital twin of the environment based on the one or more adjusted field of views and the one or more anomalous characteristics;
  - performing a tessellation routine and a texture mapping routine on the one or more nominal images, the one or more auxiliary nominal images, the one or more anomalous images, and the one or more auxiliary anomalous images to generate a plurality of synthetic images; and
  - labeling, for each synthetic image from among the plurality of synthetic images, the synthetic image as one of an anomalous type, a nominal type, or a combination thereof.

11. The system of claim 10, wherein the instructions further comprise performing a decimation routine on the one or more nominal images and the one or more anomalous images to generate the plurality of synthetic images.

12. The system of claim 10, wherein the texture mapping routine is a UV mapping routine.

13. The system of claim 10, wherein the field of view is based on a nominal position coordinate of the image sensor and a nominal orientation of the image sensor.

14. The system of claim 10, wherein the instructions further comprise performing an augmentation routine on the plurality of synthetic images in response to labeling the plurality of synthetic images.

15. The system of claim 10, wherein the one or more adjusted field of views are based on an adjusted position coordinate of the image sensor, an adjusted orientation of the image sensor, or a combination thereof.

16. A method comprising:
- generating one or more nominal images of at least a portion of a digital twin of an environment, wherein the digital twin is a virtual representation of the environment, wherein the one or more nominal images are based on a field of view of an image sensor of the digital twin and one or more nominal characteristics of one or more components of the digital twin, and wherein the field of view is based on a nominal position coordinate of the image sensor and a nominal orientation of the image sensor;
- defining one or more adjusted field of views of the image sensor;
- generating one or more auxiliary nominal images of the portion of the digital twin of the environment based on the one or more adjusted field of views and the one or more nominal characteristics, wherein the one or more adjusted field of views are based on an adjusted position coordinate of the image sensor, an adjusted orientation of the image sensor, or a combination thereof;
- defining one or more anomalous characteristics of the one or more components;
- generating one or more anomalous images of the portion of the digital twin of the environment based on the field of view and one or more anomalous characteristics of the one or more components;
- generating one or more auxiliary anomalous images of the portion of the digital twin of the environment based on the one or more adjusted field of views and the one or more anomalous characteristics;
- performing a tessellation routine and a texture mapping routine on the one or more nominal images, the one or more auxiliary nominal images, the one or more anomalous images, and the one or more auxiliary anomalous images to generate a plurality of synthetic images; and
- labeling, for each synthetic image from among the plurality of synthetic images, the synthetic image as one of an anomalous type, a nominal type, or a combination thereof.

17. The method of claim 16 further comprising performing a decimation routine on the one or more nominal images and the one or more anomalous images to generate the plurality of synthetic images.

18. The method of claim 16 further comprising performing an augmentation routine on the plurality of synthetic images in response to labeling the plurality of synthetic images.

19. The method of claim 16, wherein the texture mapping routine is a UV mapping routine.

20. The method of claim 16, wherein the image sensor is disposed on one of a robot and a structure of the digital twin.

* * * * *